Feb. 26, 1929.

A. B. HALL ET AL 1,703,233

BATTERY INDICATOR

Filed April 13, 1927

INVENTOR
ALFRED B. HALL.
JAMES H. QUILHOT.

Richard B. Owen
ATTORNEY

Patented Feb. 26, 1929.

1,703,233

UNITED STATES PATENT OFFICE.

ALFRED B. HALL AND JAMES H. QUILHOT, OF NEW YORK, N. Y.

BATTERY INDICATOR.

Application filed April 13, 1927. Serial No. 183,533.

This invention relates to battery indicators and in particular to a type adapted to be placed in position in the storage battery to indicate the activity thereof, the water level therein and the charging action when the same is being acted upon by any charging agent.

A particular object of the invention is to provide a vent cap which will allow for the expansion of the liquid or acid in the cell and the giving off of gas thereby which will prevent the actual escape of the gas into atmosphere and which will, through the medium of its indicating means, show the activity of the acid in the battery.

A still further object of the invention is to provide an indicator which will show the condition of the battery, that is, whether it is charged fully or less and one which will also indicate when the liquid in the battery needs replenishing.

To enable others skilled in the art to fully comprehend the underlying features of our invention that they may embody the same in the various modifications in structure and relation contemplated, a drawing depicting a preferred form has been annexed as a part of this disclosure and in such drawings, similar reference characters denote corresponding parts throughout all the views, of which, Figure 1 is a view in side elevation of a portion of a storage battery having shown secured therein, our improved indicator, the same being shown in section to illustrate the construction thereof.

Figure 2 is a top plan view of the indicator illustrated in Figure 1.

Figure 3 is a section taken on the line 3—3 of Figure 1, the same being taken through the glass dome or head portion of the indicator to show the position of the correlated parts, and Figure 4 is a section taken on the line 4—4 of Figure 1, the same being taken through the float housing.

Referring to the drawings in detail, 5 indicates the casing of a storage battery, which is usually made of compound, wood, or other acid-resistant substance, and which is tapped as at 6 at any suitable point so that the plug 7 may be threaded therein, the same consisting of a flanged portion 8, shaped to provide in its upper surface and centrally thereof, the washer holding groove 9, the inward extension thereof being arranged to provide a bulb receiving opening 10, the bottom of which is provided with suitable gas ports 11, disposed circumferentially of a conical mid section 12, the upper end of which is substantially flush with the top of the bulb holder 8 and the lower portion of which is substantially convex to form a seat for a float which may be projected thereagainst. This wall, which forms the bottom or support for a glass dome 13 is indicated by the numeral 14, the enlarged central portion 12 being provided with a bore 15 to receive the stem 16 of an indicating member, the stem having free sliding movement through the bore 15 and being arranged to carry at the upper end, the indicating member 17 which may be of any configuration and, in this instance, is colored red to show at certain times that the liquid in the battery needs replenishing. The threaded collar 18 which depends from the under side but is formed integral with the bulb holding member 8, is threaded exteriorly to engage the battery casing 5 and is threaded interiorly to receive the upper end of a float housing 19. This float housing is made up of an acid-resisting material in tubular form and is provided adjacent its upper ends with the auxiliary vent ports 20, the body portion of the housing being provided spirally, or in any other suitable manner with the main vent ports 21 which are larger than the auxiliary vent ports 20 and therefore allow the escape of gas much quicker during the functioning of the indicator.

As has been before explained, the stem 16 of the indicator passes through the bore 15 of part 12 and carries at its lower end, the inverted pan float 22, this float as can be readily seen by referring to Figure 1, is in the nature of an inverted pan and is therefore very bouyant and snugly fits within the float housing 19 so that very little space is left between the periphery of the float 22 and the inner wall of the float housing 19, the slight space being sealed by the capillary action of the liquid in the battery to seal the sides of the float with the float holding chamber while the same is moving longitudinally of said chamber 19. The float stem 16 may be colored near its upper end as with green color, for instance, and indicated by the numeral 23 so that when the float 22 is raised by the liquid in the battery, the amount of green showing, will indicate the level of the contents of the battery.

In order that gas generated in the battery may escape and thereby reduce pressure, we have provided, as before mentioned, the glass dome or bulb 13 whose neck portion 24 is frictionally held within the inner periphery of a rubber washer 24, which is seated on the washer seat 9 of the dome holding portion 8 and in the upper end or at its top, is provided with the inwardly projecting bent neck 25 and it will be evident that the heat created by the chemical action within the battery will, of course, raise the liquid in the battery to a higher temperature than the outside atmosphere with the result that the glass dome or bulb is constantly cooled by the atmosphere while the gas given off by the acid working in the battery is of higher temperature and consequently, when the gas finds its way into the bulb 13, it strikes the cool wall thereof and immediately condenses and runs back through the gas ports 11 and into the battery thereby venting the battery and at the same time recovering the gas and returning it in liquid form to the battery so that two important functions are performed, namely, prevention of a large quantity of battery gas from charging the atmosphere and rapid evaporation of the contents of the battery due to the escape of the gas to atmosphere.

The operation of our device is as follows: When the same has been positioned in the upper wall of a battery casing, the float 22 will rise to the surface of the liquid in the battery casing, as can be well understood and in view of the fact that there is nothing in the casing but gas and gas is escaping up through the liquid during its action upon the battery plates, it can be seen that the gas will accumulate in the under side of the float 22 and will be imprisoned therein, its escape around the float being prevented by reason of the water seal or liquid seal, which as before explained, through capillary attraction, prevents any escape of the gas between the float and the inner wall of the float chamber 19. However, in filling up the battery with liquid, the same will cause the float to rise and the more of the green stem that is visible through the glass dome, the less the battery needs replenishing. If the liquid in the battery gets so low that the red indicator 17 rests on the upper end of the portion 12, then it is evident at a glance that the battery needs replenishing with liquid.

During the ordinary discharge of the battery or charging thereof, whichever the case may be, the indicator shows the activity of the gas in the battery by imprisoning the gas under the float 22 so that a pressure thereunder is built up, this pressure forcing, as the gas accumulates, a rise of the float 22. As the pressure is built up, the float rises higher and higher until it uncovers one of the main release ports 21 in the wall of the float housing 19, at which time the gas will escape from under the float 22 and will allow the same to suddenly drop back to its position.

It is evident, of course, that when the gas accumulates beneath the float, it will raise the same above the liquid level of the battery casing and at frequent intervals during the charge or discharge of the battery, as long as proper chemical action is taking place and gas is being generated, which shows that the plates are being properly worked upon by the liquid, there will be a jumping movement of the indicator 17 and the more rapid the jumping of the indicator the more rapid the action that is taking place in the battery.

It will also be evident, that by a glance at the battery indicator during charging to determine if the battery is properly charging and during its work, it will also be possible to determine whether or not it is discharging at the proper rate, as the accumulation of gas will occur at substantially like intervals and the action of the indicator 17 will show the work going on within the battery.

All of the parts of the battery indicator are made of acid-resistant material, such as hard rubber, glass, porcelain, or the like and the glass dome being transparent, will readily show when it is time to replenish the battery with liquid, and also the activity of the electrolytic action within the battery.

It will be noted, also, that the depending, convex portion of member 12, will be engaged by the upper side of the float 22 before the indicator 17 reaches the lower end of the vent neck 25 so that complete cutoff of the escaping gas is prevented, it of course, being understood that a vent for the gas generated in the battery must be provided at all times so that proper chemical action will take place and so that gas pressure will not be allowed to accumulate within the battery casing.

It will also be noted that the upper end of the member 12 provides a seat for the indicator 17 and is so located that it prevents the float 22 from entirely passing out of the lower end of the float chamber 19, thereby allowing it to be properly guided at all times no matter how low the liquid in the casing gets, it of course being understood that when the indicator rests on the shelf formed by the upper end of the portion 12, that it is time to replenish the battery with liquid, as the depth of the housing 19 is such, that it properly measures the height of the liquid in the casing and when the liquid falls below a point where the green is evident, then it is time to replenish the liquid of the battery. However, as long as the green stem of the indicator is in evidence, the battery is sufficiently provided with liquid and as long as the indicator moves up and down at intervals proper action is taking place within the battery during either charging thereof or discharge.

It will be evident, therefore, that we have provided a battery indicator which is adapted for use with a storage or secondary battery, which will indicate action when the battery is being charged and also action while the battery is being discharged and which will indicate when the battery has been fully charged, due to the fact that the stem of the indicator is lifted to its full height by reason of the fact that acid or liquid in the battery gives off a vapor or gas at full charge, sealing the ports in the float chamber and forcing the float upward to the limit of its travel, the film being blown out of the port when the gas gets to an excessive pressure, thereby allowing the float to return to normal position.

It is also evident that we have provided in combination with an indicator, a gas escape vent, which acts as a condenser and returns the gas in liquid form to the jar or container thereby conserving liquid and preventing rapid evaporation of the liquid in the battery.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the appended claims.

Having thus described our invention what we claim as new and desire to secure by United States Patent Office is:—

1. A battery indicator comprising a plug arranged to be threaded into a battery casing, a float housing carried by said plug having openings therein, a float, a visible indicator carried by the float, and said float being adapted to be raised by an accumulation of gas thereunder until the gas passes out through the openings in said housing.

2. The combination with a battery, of an indicator comprising a plug arranged to be threaded into the battery casing, a float housing carried by said plug having openings therein, a float, a visible indicator, a dome-like housing in which said indicator is positioned and said float being adapted to be raised by accumulation of gas thereunder until the gas passes out through the openings in said housing.

3. The combination with a battery, of an indicator comprising a plug arranged to be threaded into the battery casing, a float housing carried by said plug having gas port openings therein, a float, a visible indicator carried by said float, a dome-like housing in which said indicator is positioned and said float being adapted to be raised by an accumulation of gas thereunder until the gas passes out through the openings in said housing, and a vent neck in said dome for allowing escape of gas in the battery casing to atmosphere.

In testimony whereof we affix our signatures.

ALFRED B. HALL. [L. S.]
JAMES H. QUILHOT. [L. S.]